(12) United States Patent
Sawyers et al.

(10) Patent No.: US 10,164,444 B2
(45) Date of Patent: *Dec. 25, 2018

(54) ENERGY STORAGE CHARGING FROM AN ADJUSTABLE POWER SOURCE

(71) Applicant: Hewlett-Packard Development Company, L.P., Houston, TX (US)

(72) Inventors: Thomas P. Sawyers, Houston, TX (US); Jon G. Lloyd, Houston, TX (US); John Wozniak, Houston, TX (US); Christopher K. Matthews, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,584

(22) Filed: Jun. 6, 2017

(65) Prior Publication Data

US 2017/0271905 A1    Sep. 21, 2017

Related U.S. Application Data

(63) Continuation of application No. 14/397,532, filed as application No. PCT/US2012/035886 on Apr. 30, 2012, now Pat. No. 9,698,618.

(51) Int. Cl.
*H02J 7/00*   (2006.01)
*H01M 10/46*  (2006.01)
(Continued)

(52) U.S. Cl.
CPC ......... *H02J 7/0021* (2013.01); *H01M 10/446* (2013.01); *H01M 10/448* (2013.01);
(Continued)

(58) Field of Classification Search
CPC ...................................................... H02J 7/0072
(Continued)

(56) References Cited

U.S. PATENT DOCUMENTS 4,977,364 A    12/1990  Kordesch et al.
5,589,757 A    12/1996  Kiang
(Continued)

FOREIGN PATENT DOCUMENTS

| CN | 101071888 | 11/2007 |
|---|---|---|
| CN | 102290852 | 12/2011 |
| WO | WO-2011/053280 A1 | 5/2011 |

OTHER PUBLICATIONS

International Search Report and Written Opinion received in PCT Application No. PCT/US2012/035886, dated Nov. 28, 2012, 1-pgs.

*Primary Examiner* — M Baye Diao
(74) *Attorney, Agent, or Firm* — HPI Patent Department (57) ABSTRACT

An energy storage device includes an integrated fuel gauge that is operatively connected to the energy storage device. The fuel gauge evaluates an operating parameter of the energy storage device and dynamically determines a state of charge. The fuel gauge communicates a communication including a requested operating parameter to the charging component with the single communication line and the signal indicates to an operating system component a change of an energy storage device state. The signal is used to trigger an alert or interrupt that causes the operating system component to display the change of the energy storage state based on the signal.

20 Claims, 6 Drawing Sheets

(51) Int. Cl.
  *H02J 7/04* (2006.01)
  *H01M 10/44* (2006.01)

(52) U.S. Cl.
  CPC .......... *H01M 10/46* (2013.01); *H02J 7/0047* (2013.01); *H02J 7/0073* (2013.01); *H02J 7/04* (2013.01); *H02J 2007/005* (2013.01); *H02J 2007/0098* (2013.01)

(58) Field of Classification Search
  USPC ...................................................... 320/134
  See application file for complete search history.

(56) References Cited

U.S. PATENT DOCUMENTS

| | | | |
|---|---|---|---|
| 6,300,743 | B1 | 10/2001 | Patino et al. |
| 7,605,565 | B2 * | 10/2009 | Wozniak ........... H01M 10/4207 320/134 |
| 8,076,904 | B2 | 12/2011 | Nakano et al. |
| 8,242,738 | B2 | 8/2012 | Barsukov |
| 2003/0184256 | A1 | 10/2003 | Kopf et al. |
| 2008/0252277 | A1 * | 10/2008 | Sase ..................... H02M 3/157 323/283 |
| 2009/0146826 | A1 | 6/2009 | Gofman et al. |
| 2010/0277129 | A1 | 11/2010 | Long et al. |
| 2011/0316548 | A1 | 12/2011 | Ghantous et al. |
| 2012/0025786 | A1 * | 2/2012 | Heizer .................. H02J 7/0077 320/160 |
| 2012/0062181 | A1 | 3/2012 | Lee et al. |
| 2012/0086406 | A1 | 4/2012 | Maeagawa |
| 2013/0082662 | A1 | 4/2013 | Carre et al. |

\* cited by examiner

ENERGY STORAGE CHARGING FROM AN ADJUSTABLE POWER SOURCE

PRIORITY APPLICATION INFORMATION

This application is a Continuation of U.S. National Stage application Ser. No. 14/397,532 filed on Oct. 28, 2014, which claims priority to International Application No. PCT/US2012/035886 filed on Apr. 30, 2012. The contents of which are incorporated herein by reference in its entirety.

BACKGROUND

Rechargeable batteries may require some form of battery charging system. Battery charging systems transfer power from an energy source, such as household AC power, into the energy storage (e.g., the battery). The recharging process in a battery generally includes regulating voltages and currents from the power source with a charger, so that the voltages and currents supplied to the power storage meet the particular power storage's charging specifications. For example, if the voltages or currents supplied to a battery are too large, the battery can be stressed or damaged. On the other hand, if the voltages or currents supplied to a battery are too small, the charging process can be slow and inefficient. Additionally, if the charging process is not carried out efficiently, the battery's capacity may not be optimally used and its useful lifetime (the number of charge/discharge cycles available) may be reduced.

SUMMARY

In one embodiment, a system comprises an energy storage unit comprising an energy storage device and a fuel gauge operatively integrated to the energy storage device that evaluates an operating parameter of the energy storage device, dynamically determines a state of charge of the energy storage device and communicates a communication via a communication line to an adjustable power source and an operating system component. The fuel gauge indicates to the operating system component a change of an energy storage device state and communicates the communication comprising a requested operating parameter to the adjustable power source with the communication line according to a predetermined charge profile based on the state of charge determined.

In another embodiment, a method comprises monitoring, via a fuel gauge, a state of charge of an energy storage unit that includes an energy storage device with the fuel gauge operatively integrated with the energy storage device. The method comprises determining, by the fuel gauge, an operating parameter of the energy storage device and a requested operating parameter for the energy storage device according to a predetermined charge profile based on the state of charge. The method comprises communicating a request comprising the requested operating parameter via a single communication line for an adjustable power source to adjust a charge current to the charge the energy storage device, and indicating to an operating system component communicatively coupled to the energy storage unit a change of an energy storage device state via the single communication line.

DETAILED DESCRIPTION

Battery characteristics, including specified voltages and recharge currents for the battery's cells, can be different from battery to battery. The cycle of increasing and decreasing charge current and cell voltage may be repeated many times at each transition between current levels, resulting in undesirable stress on the battery and unnecessarily long charging time. Furthermore, the stress on the battery may result in a relatively short battery life.

Charging the battery is often done by using programmable settings of charge current and charge voltage. For example, fully programmable charging methods use $I^2C$ communications with the battery's fuel gauge to program a charge integrated circuit. A smart charger integrated circuit can read the requested current and the requested voltage from registers in the fuel gauge to program the charger, or an embedded controller is used as a host to read the communications and program the charger integrated circuit.

One or more implementations of the present disclosure are described with reference to the attached drawings, wherein like reference numerals are used to refer to like elements throughout. A fuel gauge integrated with an energy storage device is operable to output a single signal via a single communication line in order to control charging of the energy storage device, such as a battery. The single signal is communicated to an adjustable power source, such as an AC adapter or other power source. The output of the power source is adjusted according to the signal received from the fuel gauge using one signal communication line including one contact to the fuel gauge. Consequently, no embedded controller or host is necessary to adjust the charging of the energy storage device during a charging cycle. No smart charge integrated circuit is required, and a small, low cost charging system is fully programmable.

An storage device is not limited to a battery and can include any energy storage device, such as batteries, capacitors, super-capacitors, ultra-capacitors, fuel cells, cell banks, power banks, optical cells, power grids, and/or the like devices that can store chemical energy, electrical energy, mechanical energy, magnetic energy, optical energy, or any potential energy that can be regenerated and transformed into kinetic energy.

In one embodiment, a fuel gauge and an energy storage device are integrated into one energy storage unit. In the absence of additional loads to the energy storage device being charged on the power source, the fuel gauge and the energy storage device enable a desired charging profile by only using the signal to set the current of the power source, without requirements for additional sensing of the energy storage device, other than the power source regulating the power source's current.

Various aspects of charging a smart energy storage device from an adjustable power source are disclosed. For example, a method is disclosed that comprises monitoring a state of charge of an energy storage unit including an energy storage device with a fuel gauge that is operatively integrated with the energy storage device. State of charge may be comprised of voltage and/or current and/or running count of energy and/or estimated percent full, or other such measure of the charge state. For example, the fuel gauge and energy storage device (e.g., battery) are integrated as one circuit that is removable and rechargeable as one unit. An operating parameter of the energy storage device, such as a charge voltage or a charge current is determined by the fuel gauge, which operates as a smart fuel gauge. A requested operating parameter for the energy storage device is determined according to a predetermined charge profile based on the state of charge, and is communicated to the adjustable power source, such as an AC adapter to provide the requested operating parameter.

Additionally, the single communication line is used to indicate a change of an energy storage device state to an operating system component. For example, the fuel gauge communicates a requested parameter to the adjustable power source during a charging cycle. The fuel gauge can communicate multiple different requests including different charge currents/voltages to the adjustable power source, which causes different charging parameters at different times to be provided to the energy storage unit during the charging cycle. The fuel gauge uses the same signal to trigger a notification (e.g., an alert or interrupt) to the operating system component to indicate a change of an energy storage state. For example, a charge begin point, a charge end point, a discharge begin point, a discharge end point, a full capacity register update or a fuel gauge percentage update.

Figure 1:
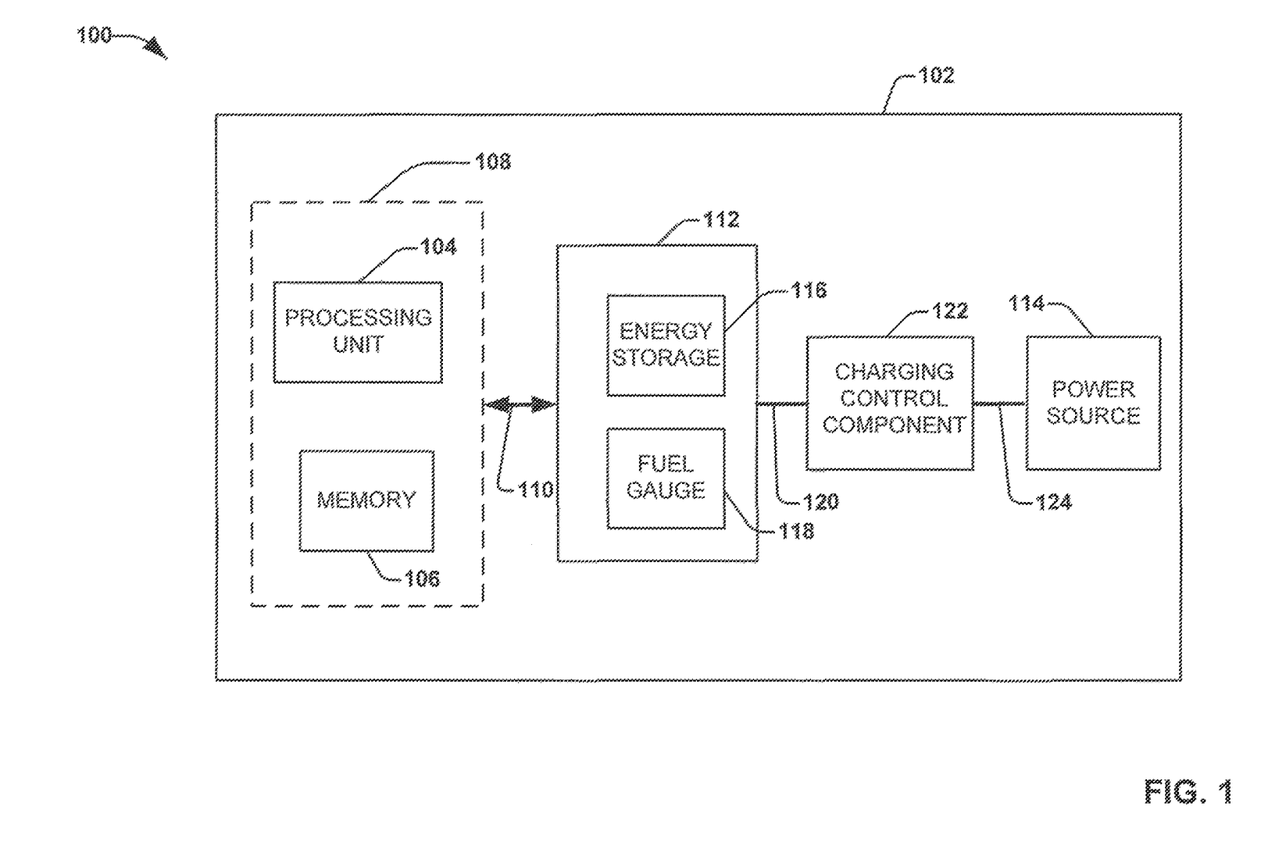
FIG. 1 is an example charging system in accordance with various aspects disclosed.

Referring now to FIG. 1, illustrated is an example of a high level block diagram of a system 100 that charges an energy storage device from an adjustable power source. In one example configuration, the system 100 comprises a computing device 102 to monitor a status or state of an energy storage unit 112. Example computing devices include, but are not limited to, personal computers, server computers, hand-held or laptop devices, tablets, mobile devices (such as mobile phones, Personal Digital Assistants (PDAs), iPads, iPods, Mp3 players, media players, and the like), or any consumer electronic, for example, and the like.

The computing device 102 includes a processing unit 104 and memory 106. A memory 106 may be volatile (e.g., RAM), non-volatile (e.g., ROM, flash memory, etc.) or some combination of the two. The system 100 includes an operating system component 108 that manages hardware and software for the system, as shown by the dashed line. The computing device 102 can include additional features and/or functionality. For example, device 102 can also include additional storage (e.g., removable and/or non-removable) including, but not limited to, magnetic storage, optical storage, and the like.

The computing device 102 can also include a communication component 110 that enables the computing device 102 to communicate with other devices, such as an energy storage unit 112 for powering the computing device 102. Computing device 102 may include input device(s) (not shown) such as keyboard, mouse, pen, voice input device, touch input device, infrared cameras, video input devices, and/or any other input device. Output device(s) (not shown) such as one or more displays, speakers, printers, and/or any other output device may also be included with computing device 102.

The computing device 102 further comprises a power supply or a power source 114 for charging an energy storage device 116 of the energy storage unit 112. The power source, for example, operates as a device that supplies electrical energy to one or more electrical loads, such as the computing device 102, and can be a regulated power supply that controls the output voltage or current to a specific value, such as an AC adapter or other adjustable power supply that can be internal or external to the system 100.

In one example, the energy storage unit 112 comprises the energy storage device 116 and a fuel gauge 118 operationally connected to the energy storage device 116, forming an integrated single energy storage unit. The energy storage unit 112 can be rechargeable, removable and when connected to an appropriate power source 114, can control charging of itself with the fuel gauge 118, which can be a fully programmable smart fuel gauge. The energy storage 116 can include one or more energy storage cells (e.g., battery cells, or power bank cells) and can be programmed with a charge taper algorithm that tapers the charge current to different levels based on a state of the energy storage device. The tapering algorithm can correspond with step charge requirements corresponding to the cells of the energy storage.

The energy storage 116 can include a programmable processor configured to receive and perform processing operations on data, and to receive and carry out processing instructions. For example, batteries conforming to the Smart Battery Data Specification promulgated by the Smart Battery System Implementers Forum may be suitable, as well as other batteries that are not smart batteries and/or other smart energy storage units that are not battery (e.g., capacitor banks, fuel cells, etc.).

The power source 114 is an adjustable power source/supply that is operationally connected to the energy storage unit 112 via the communication line 120, charging control component 122, and adjust signal 124. For example, the communication line 120 is a single communication line including a single connection between or at the energy storage unit 112 and charging control component 122, which converts the signal communication line 120 into an adjust signal 124, which is used in control of the adjustable power source 114. In one aspect, the communication line 120 is directly connected to the fuel gauge 118 of the energy storage unit 112 and to the charging control component 122 with one connection to fuel gauge 118.

The fuel gauge 118 can output a single signal that initiates a charge of the energy storage, alters a charge level (e.g., a charge current and/or charge voltage) of the energy storage during a charge cycle, and/or terminates charging of the energy storage. In one example, the fuel gauge 118 controls charging of the energy storage 116 via the single communication line 120 to control adjustment of the power source 114 (e.g., an adjustable power source). The fuel gauge 118 determines a charge status of the energy storage during a charge cycle and based on the charge status compares an operation parameter (e.g., a charge current and/or charge voltage) to the charge status according to a predetermined charge profile. The predetermined charge profile can be stored in a storage location (e.g., memory 106 or some other memory, register, buffer, etc.) of the system and/or the energy storage unit 112, which is further detailed below.

In one embodiment, the fuel gauge 118 utilizes the single communication line 120 to control adjustment of the power source 114 and to also provide an indication or notification to the operating system component 108 that a change in an energy storage device state has occurred. The operation system component 108 receives status information (e.g., charge status of operational parameters) from the fuel gauge 118 via the single communication line 120, which has a single connection to the fuel gauge. For example, the communication line or channel 110 can be directly connected to the communication line 120 to receive the same signals sent to the power source. The information signaled to the power source 114 from the fuel gauge 118 is used to provide an indication or triggering event related to the charging cycle.

For example, the signal data communicated can be displayed in a user display of the computer device 102, and interpreted by the operating system component 108 as a triggering event (e.g., an alarm or indication that the battery is charging) for the energy storage 116. In response to the signal sent from the fuel gauge 118 on communication line 120, the operating system 108 is thus configured to interpret a triggering event and cause alarms and/or interrupts to indicate an energy storage state, such as a full status, an empty status, a percentage update, a charge beginning point, a charge ending point, a discharging beginning point, and/or a discharge ending point.

In another embodiment, an initiation signal or a termination signal can be generated by the fuel gauge when a charge state or status has crossed a predetermined threshold. The fuel gauge detects that the charge status is low and signals to the power source 114 the desired operating parameter based on a predetermined charging profile. The fuel gauge 118 is then operable to update or store the operating parameters (charging current or charging voltage) to registers or memory of the energy storage unit 112 (not shown).

Concurrent to the power source 114 receiving the signal (e.g., initiation or termination signal), the operating system 108 is configured to also receive the signal from the communication line 120 through the communication line 110. Based on the signal being sent, the operating system component 108 can indicate an energy storage state. For example, the change of energy storage state indicated can be a charge begin indication, a charge end point, a discharge begin point, a discharge end point, an update to a full capacity register indication, and/or an update of the fuel gauge percentage full indicator.

The fuel gauge 118 is operable to receive and report the voltage per cell of the energy storage 116, the total voltage and the charge and discharge current. For example, the charge status (current discharge current/voltage, charge current/voltage, per cell or total of the energy storage) thus is used to determine a requested operating parameter (e.g., a requested charge current/voltage). The fuel gauge 118 continually updates the requested operating parameter (e.g., in a predefined interval) during the charging process or cycle) in order to continually indicate the desired charge current/voltage throughout a charge, via one signal over the single communication line 120. For example, the fuel gauge 118 generates a signal on the communication line 120 that is a pulse width modulated signal corresponding to a desired constant current.

Figure 2:
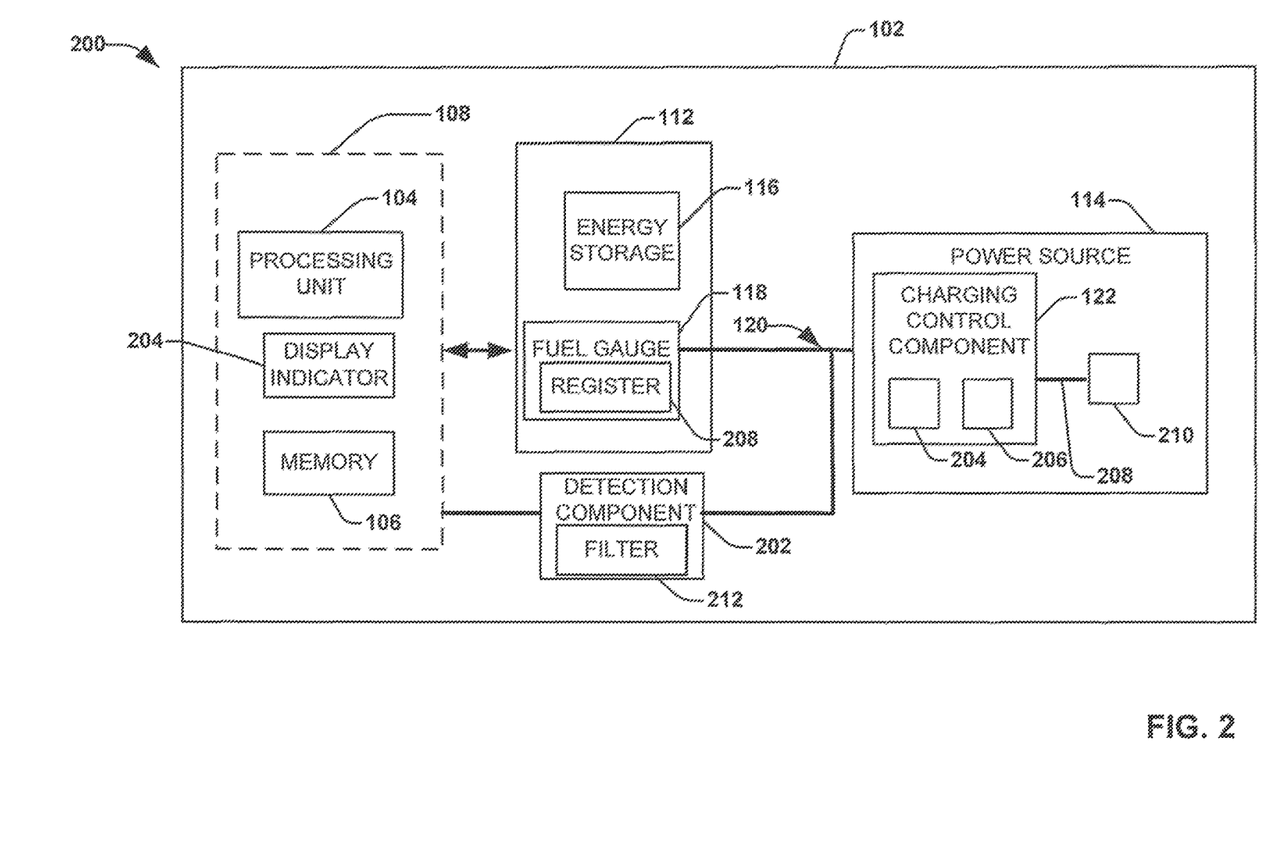
FIG. 2 is an example charging system with a detection component in accordance with various aspects disclosed.

Referring now to FIG. 2, illustrated is an example of a system 200 that charges an energy storage device from an adjustable power source including a regulating circuit 210 for regulating an operating parameter (e.g., a current output). The system 200 further includes the charging control component 122, an error amplifier 204 and a filter 206 that controls the charge current/voltage to a desired profile during a charging cycle of the energy storage 116. The fuel gauge 118 is integrated with the energy storage 116 in the energy storage unit 112 as one integrated unit, which can be removable, rechargeable, and control its own charging current during charging without an external microprocessor. The fuel gauge 118 outputs a single signal to the charging component on the single communication line 120, which is read by the charging control component 122. In response to reading the signal, the charging control component 122 initiates charging of the energy storage 116, alters the charge current/charge voltage to any desired profile, and/or terminates the charge, without using $I^2C$ signal, an external microcontroller and/or handshake signaling. Rather, the fuel gauge 11820 signals these charging status events via a single signal over the communication line 120. In addition, the charging control component 122 could alternatively be located within power source 114, as shown in FIG. 2. In one example, the charging control component 122 comprises the error amplifier 204 and the filter 206. The fuel gauge 118 transmits a communication signal to the charging control component 122 along the communication line 120. The communication signal transmitted is, for example, a pulse width modulated (PWM) signal. The PWM signal can have a duty cycle, for example, that is proportional to a desired charge current/voltage. The desired charge current can correspond to a predetermined operation profile with respect to time during a charging cycle or process. The desired current, for example is determined from the operational profile at any given time during the charging process and can be used as a reference by the charging control component 122 in order to compare the desired charge current with the charge current status. For example, the actual current/voltage of the energy storage is sensed and compared to the requested current/voltage. In return, the charging control component 122 can output an adjusting signal via a second or different communication line 208. The adjusting signal from the charging component 122 can adjust the output of the charging control component current, and/or adjusts the output current/voltage of the power source 114, such as an AC adapter.

The system 200 further comprises a detection component 202 that can detect the signal via the communication line 120. The detection component 202 includes a detection filter 212 that can be a low pass filter that filters out the signal via the line 120 for the adjustable power source 114 and enables a frequency change to be detected. The fuel gauge 118 transmits a communication signal to the charging component 202 along the communication line 120. The communication signal transmitted is, for example, a pulse width modulated (PWM) signal. The PWM signal can include a duty cycle, for example, that is proportional to a desired charge current/voltage. The desired charge current can correspond to a predetermined operation profile with respect to time during a charging cycle or process. A desired current, for example is determined from the operational profile at any given time during the charging process and can be used as a reference by the charging component 202 in order to compare the desired charge current with the charge current status. For example, the actual current/voltage of the energy storage is sensed and compared to the requested current/voltage. In return, the charging control component 122 can output an adjusting signal via a second or different communication line 208. The adjusting signal from the charging component 202 can be used to adjust the output of the charging component current, and/or adjusts the output current/voltage of the power source 114, such as an AC adapter.

In another embodiment, the PWM signal from the fuel gauge 118 corresponds to a requested current that is received at the filter 206. The filter 206 is a low pass filter that passes low frequency signals, but attenuates signals higher than a certain cutoff frequency. Filter 206 attenuates and filters the PWM signal into a DC average. The filtered signal is then received by the error amplifier 204. A reference current is sensed by the error amplifier 204 that compares the requested current with the sensed current and results in the a constant current section of a current/voltage profile, for example, for a Lithium polymer battery or some other battery or power/energy storage device (e.g., capacitor and the like). The charging component thus operates to generate a constant current to the energy storage device and the PWM signal from the fuel gauge 118 generates the transitions to various charge levels.

In response to the PWM signal decreasing or increasing beyond a certain threshold the low pass detection filter 212 of the detection component 202 detects the change and provides the signal to the operating system component 108 to indicate that a change in the energy storage state has occurred. Thus, the fuel gauge is also operable to indicate a change in state to the operating system component 108. Rather than utilizing an external or additional processor for communicating with a systems operating system, the fuel gauge 118 is able to signal via a triggering event (e.g., an alarm or interrupt signal) a change in the energy storage state. The filter 206 and the detection filter 212 can be the same filter or separate filters as shown.

The signal to the operating component 108 can be used to generate an interrupt, by changing the PWM signal to be detected by the detection component 206. For example, the frequency of the PWM signal could temporarily decrease, which could be detected by a filter 206. The standard frequency of the PWM from the fuel gauge 118 could be filtered out, and a lower frequency, for example, could be detected. Additionally, a beginning of the PWM and the end of PWM can also be detected. Upon detection by the detection component 202 of a change or modification of the PWM signal from the fuel gauge 118, an alter flag or interrupt pulse could be generated in hardware or software of the operating system component 108 of the computing device 102. Alternately, the PWM could stop and restart to toggle, or if the signal was not toggling, it could toggle twice, to trigger the detection component 206 detector, and create an interrupt. Additionally or alternatively, the fuel gauge 118 can be able to trigger a detection component 202 of a particular energy storage state. For example, the PWM frequency communicated over the communication line 120 could vary with a variance of an operating parameter. For example, a PWM frequency of 24 kHz or some other frequency could indicate that the energy storage device (e.g., a battery) 116 is between 0 and 90% full, but a 8 kHz PWM could indicate 90% or more of capacity is charged. These indications are triggered, communicated or caused by the fuel gauge 118, and enable the operating system component to directly or indirectly generate an interrupt without the need of a microcontroller or processor for communicating with the operating system component 108. The operating system component 108 is then operable to update a display indicator 204 that indicates a percentage full, a capacity full, a charge begin point, a charge end point, a discharge begin or a discharge end point in response to the interrupt or alarm initiated by the fuel gauge 116.

The detection filter 206 can be a low pass filter, for example, that passes low frequency signals, but attenuates signals higher than a certain cutoff frequency. The filtered signal can then further be compared with a reference current is sensed by a voltage regulator 204 of the power source 114 that compares the requested voltage/current with the sensed voltage/current and then alter the current accordingly during a constant current/voltage profile. The charging component thus operates to generate a constant current to the energy storage device and the PWM signal from the fuel gauge 118 generates the transitions to various charge levels during a single charging cycle of the energy storage device 116.

Because the fuel gauge 118 and/or the charging component 202 can be used to calculate or estimate a charge current that results in a desired voltage of the battery, the requested current is dynamic. The requested current, for example, is updated in periodic intervals (e.g., every second, two seconds, or the like) in order to cause voltage to be regulated. For example, a total battery voltage (of all cells or energy storage devices), or an individual cell voltage, or the highest cell voltage, etc., can be regulated. Thus, the energy storage unit 112 is configured to control a taper current for charging algorithms that require multiple voltage steps.

The energy storage unit 112 or the fuel gauge 118 outputs a signal that is used to set the charge current. The power source 114 is configured to receive the signal to set its output current limit by dynamically adjusting the output current with the regulating circuit 210. Thus, where energy storage charging is the only significant load on the power source, the fuel gauge could deliver the PWM signal directly to the power source without need for a hardware block or additional sense circuitry. For example, the power source 114 can be an adjustable AC adapter that powers a sleeve accessory for a tablet computer, where the sleeve contains a rechargeable energy storage device, but no other functions are being powered.

In systems with more than one energy storage device, each energy storage device can output a signal from a respective fuel gauge. If the system can select an energy storage device to charge, then it can select the signal from that energy storage device, and additionally block the signals from the other batteries. Instead of indicating a desired or requested current from the power source 114, the signal from the fuel gauge 118 can likewise indicate the desired voltage from the power source 114. Additionally or alternatively, where the charging is done while the power source powers another parallel load, and the desired current delivered to that other load is known, then a similar signal corresponding to that other load could be generated, and eventually summed with the signal from the energy storage device fuel gauge.

An advantage of the systems described is that the systems provide a fully programmable charging system with minimum hardware. For example, as the fuel gauge 118 is used for other reasons, a fully programmable charging system can be employed with minimum cost. It can be used with a small constant power AC adapter, or with any AC adapter of sufficient power rating that can generate a voltage that is adjustable over the operational range with no additional microcontroller, such as a keyboard controller.

Figure 3:
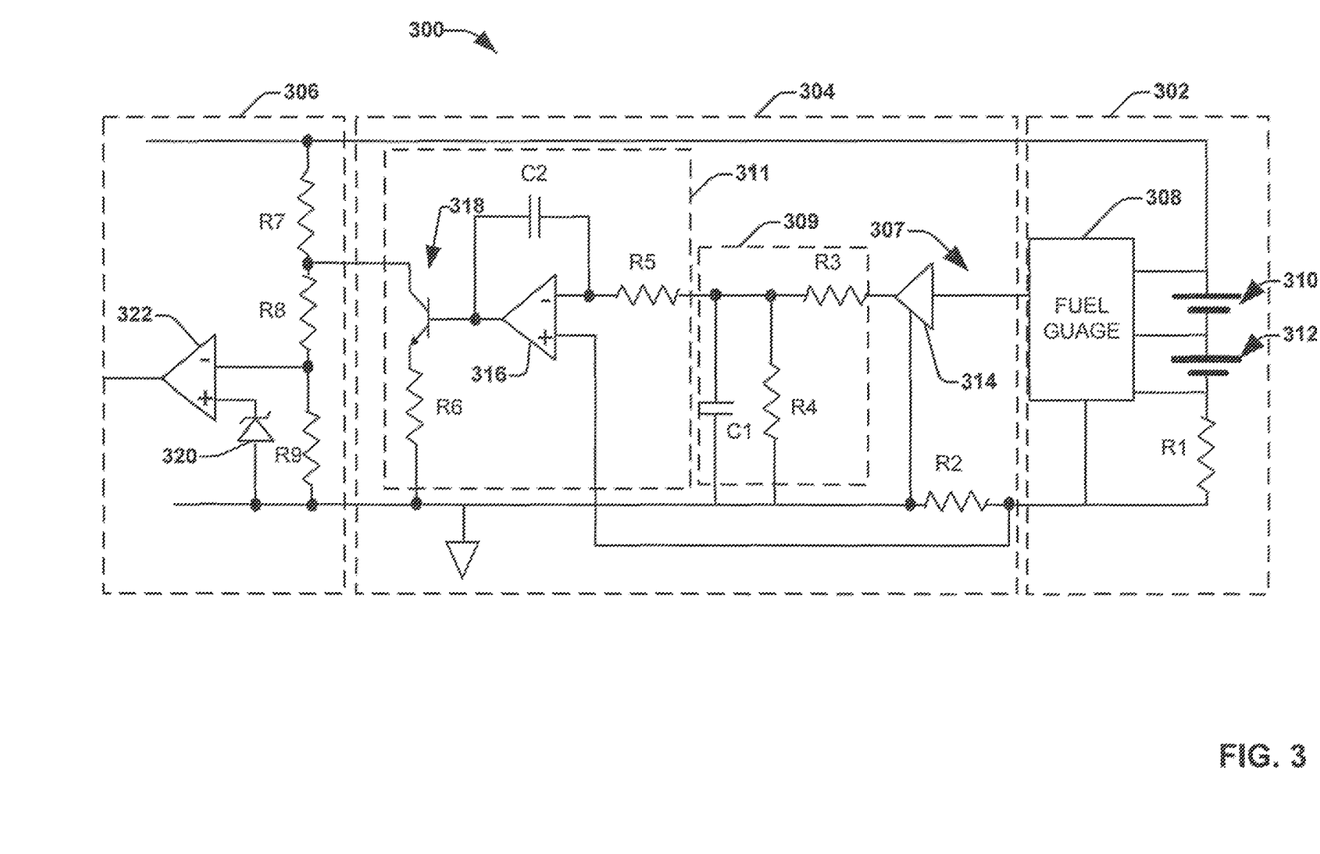
FIG. 3 in example circuit diagram of a charging system in accordance with various aspects disclosed.

Referring now to FIG. 3, illustrated is an example of circuit diagram of a system 300 for charging an energy storage device in accordance with various aspects disclosed herein. The system 300 includes an energy/power storage unit 302, a charging control component 304, and a power source or supply 306 that operates as an adjustable power source for controlling charge current to various levels.

The energy storage unit 302 comprises a fuel gauge 308 and one or more energy storage cells 310 and 312, such as batteries, batteries with a plurality of cells or other potential energy storage cells. The fuel gauge 308 and the energy storage cells 310, and 312 are integrated into the same energy storage unit 302, which is operable as a removable and rechargeable energy storage unit, such as a laptop battery, or other handheld device energy storage device (e.g., a removable fuel cell, either biological, chemical electrical, capacitive unit, and the like). The fuel gauge 308 receives and reports the voltage per energy storage cell 310 and 312 separately or in combination. The fuel gauge 308 and energy storage 312 and 310 are coupled to a current sense resistance or resistor R1 within the energy storage unit 302. The energy storage cells 310 and 312 can be combined into one energy/power storage bank or multiplied to form a plurality of cells in various banks.

The fuel gauge 308 is further operable to receive and report a total voltage of both the energy storage cells 310 and 312, and by reading voltage across R1 a charge or discharge current of any combination thereof. For example, a single communication line or channel 307 operably connects the fuel gauge and the charging control component 304. In the example configuration of FIG. 3, the communication line 307 has one connection for communication between the fuel gauge and the power source 306. The communication is done through charging control component 304. The fuel gauge 308 communicates a PWM signal including a duty cycle. For example, the PWM duty cycle can be set to correspond proportionally to the desired or requested charge current. The PWM is communicated to the filter 309 (e.g., a low pass filter) via a buffer unit 314 (e.g., an operational amplifier, unity gain amplifier, comparator, etc.). The filter 309 includes a low pass filter including resistor R3 receiving the input signal, and resistor R4 and capacitor C1 in a parallel configuration, which average and attenuate the input signal into a current reference.

The charging component 304 further includes the current regulator 311 for maintaining a constant current level of the power source 306 before and after transient conditions. The power source 306 includes an op amp 316 including a capacitor C2 in a feedback loop and input at a positive terminal from a current sense resistor R2. The op amp senses the current through R2 of the energy storage unit 302 and compares it with the filtered PWM current reference signal from the fuel gauge including the requested current/voltage. Based on the comparison, the op amp output controls a transistor 318 including a resistor R6, to form a current signal, referred to as the adjust signal. The adjust signal is used to modify or adjust the output voltage of the adjustable power source 306 For example, a feedback voltage of a non-inverting input of the op amp 316 is regulated, and is compared to a sensed current reference to generate an error signal. Thus, a change in the PWM signal causes an error signal to be generated at the output of the op amp 316, which causes a change in charge current flow through charging control component 304 into the energy storage unit 302 hardware.

The adjustable power source 306 or adapter further includes an operational amplifier 322 including a voltage reference diode 320 at the positive terminal and an input from a voltage divider formed by resistors R7, R8 and R9 at the negative terminal. These form a voltage regulator, for controlling the output voltage of the adjustable power source 306. The current regulator 311 senses and regulates current for a constant current/constant voltage charge profile, which is further detailed in FIG. 5.

In one embodiment, the PWM signal to the current regulator 311 has a duty cycle proportional to the desired charge current for the energy storage device 302. The desired charge current is used as a reference for the charging component 304, which also senses the actual current. The voltage regulator 311, for example, compares the requested or desired current with the actual charge current status, and outputs an adjustment signal to the transistor 318, which adjusts the charger output current, or adjusts the output voltage of the power source 306 or adapter.

Additionally or alternatively, when energy storage charging is the only significant load on the power source 306, and change in the output voltage of power source 306 is relatively slow compared to the update rate of the single communication line 307, and the source is configured to receive a signal to set its output current limit, the fuel gauge 308 is operable to deliver the signal directly to the power source 306 without need for a charging component including a microprocessor, hardware blocks or additional sense circuitry. For example, an adjustable AC adapter could power a sleeve accessory for a tablet computer, where the sleeve contains a rechargeable battery, but no other functions are powered.

Alternatively, in a system with more than one battery, each battery can output a signal from a respective fuel gauge. The system can select a battery or cell to charge, select the signal from that battery unit, and block the signals from the other batteries not selected. Instead of indicating a desired or requested current from a power source, the signal from the fuel gauge could likewise indicate a desired voltage from a power source.

Figure 4:
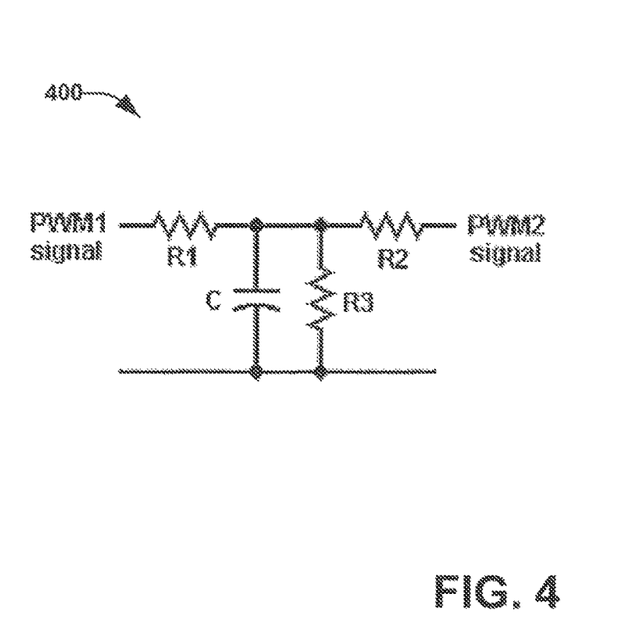
FIG. 4 is an example circuit diagram for combining current charge signals for multiple loads in accordance with various aspects disclosed.

In another embodiment, when charging is done while the power source 306 powers another load, and the desired current delivered to that other load is known, then a similar signal corresponding to that other load could be generated, and then summed with the signal from the fuel gauge. 308. For example, a PWM signal from the fuel gauge could be low pass filtered by R-C filter into an average (DC) level, and another PWM signal from another load could be low pass filtered into the same capacitor of the R-C filter 400, as shown in FIG. 4. The summed signal could control the total current for the sum of the charging and the other load.

Figure 5:
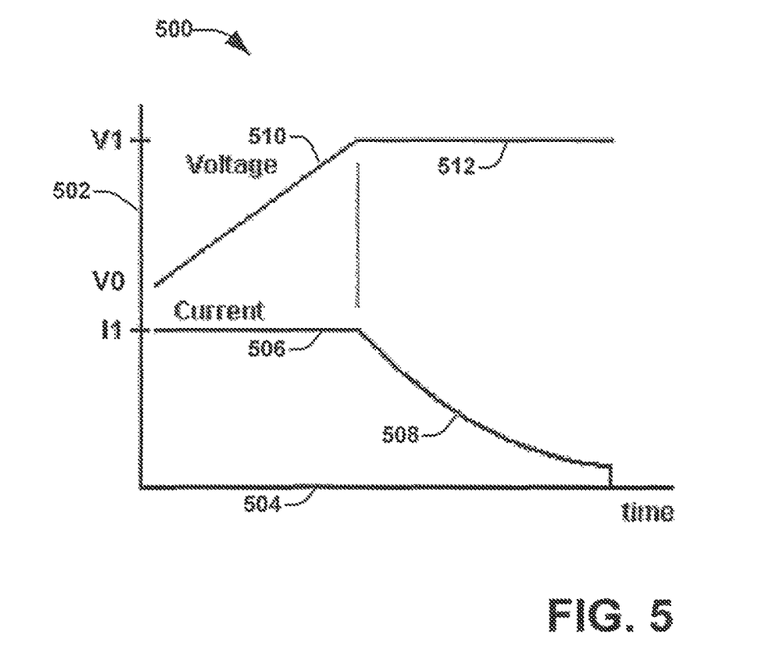
FIG. 5 is a chart illustrating charge current and charge voltage versus time for an energy storage device charged according to various aspects disclosed.

In another embodiment, additional information in the signal from the fuel gauge 306 at communication line 307 can be used to trigger an alert or interrupt to indicate to an operating system (e.g., the operating system component 108) that a change of a battery state has occurred. For example, a charge begin, a charge end, a discharge begin, a discharge end, an update to a full capacity register, an update to a fuel gauge percentage full, and/or other triggering event can be indicated by the PWM signal from the fuel gauge 306. Such events could be indicated by a change in frequency of a PWM signal, a start/stop sequence, and change in amplitude, or other specifically detectable anomalies in the signal. In one embodiment, the signal at communication line 307 could be a 24 kHz PWM signal when the fuel gauge indicates the energy storage is below 90% full, but a 12 kHz PWM signal when indicating the energy storage is 90% or greater. The trigger or alert may also cause information to be communicated through a separate signal, such as an I²C communication line Referring now to FIG. 5, illustrated is an example of a graph 500 for an operational parameter profile of an energy storage device in accordance with various aspects disclosed. A vertical axis 502 depicts a charge voltage and a charge current with respect to a horizontal time axis 504 for a charging cycle that uses a single taper charge tapering. A voltage for a cell of the energy storage device (e.g., a battery), or the energy storage device 116 initiates at time zero at an initial voltage level V0 indicated on the vertical axis 502. This initial voltage is substantially less than a maximum voltage level 512 that is supported by the energy storage device 116 and/or a cell 310, 312, for example.

A charging process or cycle begins by supplying a constant charge current to the energy storage device, as indicated at a current 506 initiating at 11 and maintaining a n approximately constant value. As the current is steadily supplied, the voltage of the energy storage device increases along the voltage curve 510. When the cell voltage reaches a threshold value V1, the charge current decreases, illustrated at the curve region 508, resulting in the voltage being held substantially constant at the curve region 512.

Figure 6:
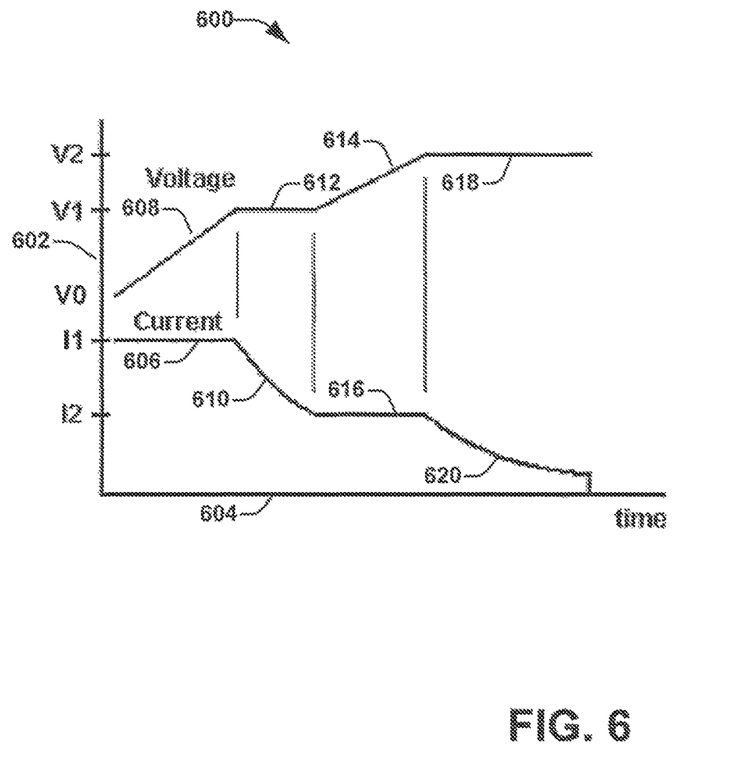
FIG. 6 is a chart illustrating charge current and charge voltage versus time for an energy storage device charged according to various aspects disclosed.

FIG. 6 illustrated is an example of a graph 600 for an operational parameter profile of an energy storage device in accordance with various aspects disclosed herein. A vertical axis 602 depicts a charge voltage and a charge current with respect to a horizontal time axis 604 for a charging cycle that uses a charge tapering algorithm with two tapers. A voltage for a cell of the energy storage device (e.g., a battery), or the energy storage device 116 initiates at time zero at an initial voltage level V0 indicated on the vertical axis 602. This initial voltage is substantially less than a maximum voltage level 618 that is supported by the energy storage device 116 and/or a cell 310, 312, for example.

A charging process or cycle begins by supplying a constant charge current to the energy storage device, as indicated at a current curve 606 initiating at 11 and maintaining an approximately constant value. As the current is steadily supplied to the energy storage device, the voltage of the energy storage device continues to increase along the voltage curve 608. When the cell voltage reaches a threshold value V1, the charge current decreases rapidly, illustrated at the corresponding current curve drop region 610 and the voltage is held substantially constant at the curve region 612 for a period of time.

The initial charge current in the method represented in FIG. 6 is maintained at a constant value until the cell voltage reaches a first voltage threshold or trigger value V1, at which point the charge current is tapered or reduced as indicated at 610. This causes the charge voltage to remain approximately constant, as indicated at 612. In some cases (not shown in FIG. 6), tapering the charge current may cause the voltage to become constant or to decrease for some amount of time, rather than merely to remain constant. Charge current tapering continues until the current reaches a value that is permissible for voltages above the first voltage trigger value V1. At this point, the current is maintained at a constant value as indicated at 616, and the voltage increases, as indicated at 614.

Further, when the cell voltage reaches a second voltage threshold or trigger value V2, the charge current is again tapered, as indicated at 620. This again results in an approximately constant charge voltage, as indicated at 618.

The above-described cycle of charging an energy storage device at a constant charge current and then a tapering charge current may be repeated any desired number of times and indicated by the fuel gauge discussed herein with any desired voltage threshold values, offset values, charge current values and charge current tapering rates. In response to the cell voltage nearing a maximum value, as indicated at 618, the charge current will be decreased toward zero current. This can be done gradually, either as part of the tapering algorithm or as an inherent feature of the battery nearing its full charge, to avoid undesirable corresponding decreases in cell voltage due to the internal cell impedance.

While the methods described within this disclosure are illustrated in and described herein as a series of acts or events, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
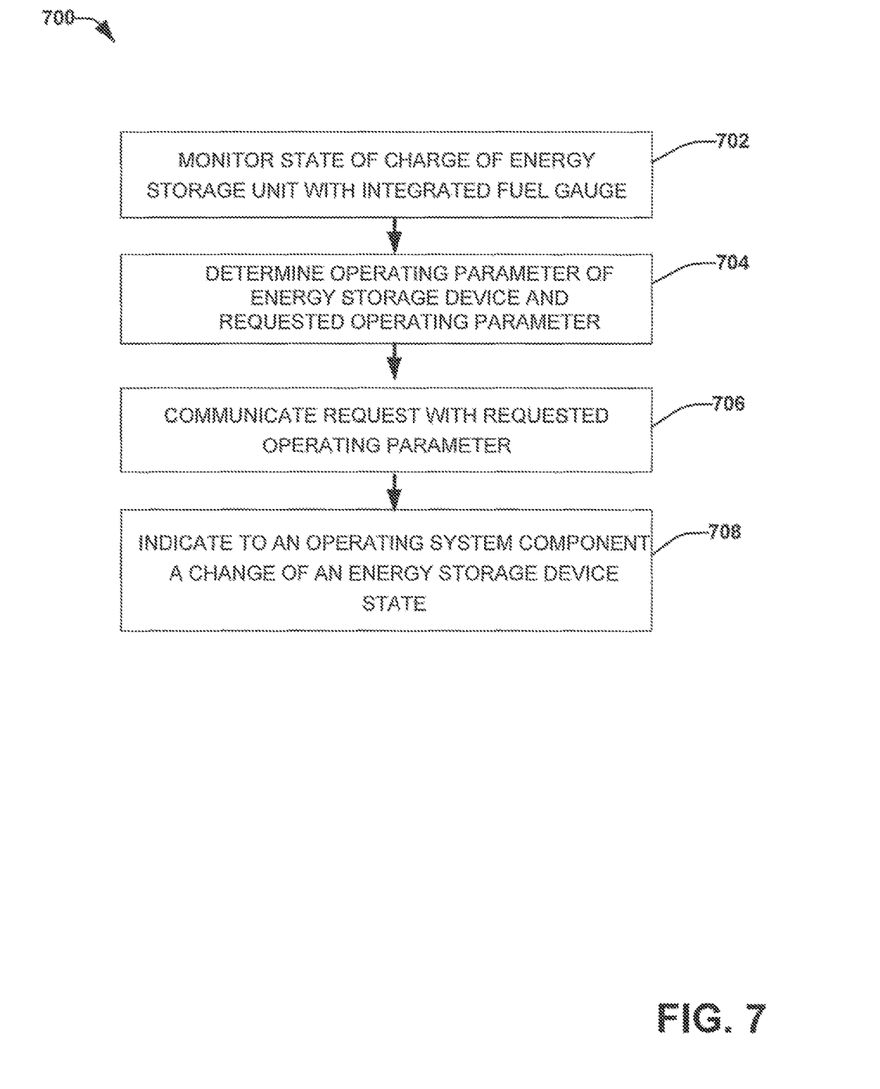
FIG. 7 is a flow diagram illustrating a non-limiting embodiment for charging an energy storage device in accordance with various aspects disclosed.

An example methodology 700 for implementing a method for an energy storage unit including an energy storage device and an integrated fuel gauge is illustrated in FIG. 7. Reference is made to the figures described above for ease of description. However, the method 700 is not limited to any particular embodiment or example provided within this disclosure.

At 702, a state of charge of an energy storage unit is monitored with a fuel gauge operatively integrated with an energy storage device. The energy storage device can be a battery, a battery including a plurality of cells, or other energy storage devices, such as a fuel cell or capacitor, for example.

At 704, an operating parameter of the energy storage device is determined and a requested operating parameter for the energy storage device is determined. In one embodiment, these determinations are made according to a predetermined charge profile based on the state of charge of the energy storage device. For example, a current parameter or voltage parameter is compared to a predetermined charge profile and the difference is used to indicate a desired or requested operating parameter (e.g., charge current/voltage) to an adjustable power source during a charging cycle.

At 706, a request comprising the requested operating parameter via a communication line to an adjustable power source. For example, the communication line can comprise a single communication line between a charging component, as described above, and/or directly to an adjustable power source for the energy storage unit to control its own charging cycle without any external microcontroller, for example.

At 708, the fuel gauge uses the same signal to the adjustable power source to indicate to an operating system component a change of an energy storage device state. For example, the change of the energy storage device state can comprise a charge beginning point, a charge ending point, a discharge beginning point, a discharge ending point, and/or a percentage full indicator update or a capacity full indicator update.

The fuel gauge is operable to modify the communication signals transmitted. For example, a modification of a pulse width modulated signal that modifies an output current of the adjustable power source can cause an interrupt or alarm to an operating system component in response to the change in the energy storage device state. In addition, an adjusting signal can also be the PWM signal modified or a different signal from the fuel gauge. The adjusting signal can modify, for example an output current of the adjustable power source during charging of the energy storage device so that the output current is different than a current received by the storage device initially when charging began.

Additionally or alternatively, in response to the operating system component detecting a modification of the pulse width modulated signal from the fuel gauge, the operating system component can generate an alter flag or interrupt pulse that varies according with a frequency of the pulse width modulated signal. In another embodiment, the modification of the pulse width modulated signal can be performed by the fuel gauge toggling the pulse width modulated signal to trigger a detector of an event of the operating system component.

The adjustable power source is controlled with a communication request from the fuel gauge via the communication line to adjust a charge current to charge the energy storage device during a charging cycle. In one embodiment, the controlling includes generating a comparison of the operating parameter with the state of charge of the energy storage device. This can be performed according to a taper algorithm as described above (e.g., FIG. 6). An adjusting signal can be generated (e.g., by the fuel gauge) that modifies an output current of the adjustable power source that charges the energy storage device at a different current during the charging cycle of the energy storage device than the charge current received by the energy storage device when the requested operating parameter is determined.

In another embodiment, the requested operating parameter can include a requested charge current or a requested charge voltage that is updated by the fuel gauge at periodic intervals during the charging cycle. In response to the adjustable power source powering an additional load from the energy storage device, the requested current/voltage can be summed with a current that is delivered to the additional load.

The method 700 further can include selecting a cell from the plurality of cells to be charged and communicating a requested charge signal for the cell that is selected to the adjustable power source, and blocking charge signals for other cells of the plurality of cells other than the cell selected.

Many variations and modifications can be made to the above-described examples. All such modifications and variations are intended to be included herein within the scope of the disclosure and protected by the following claims. It will be noted that the singular forms "a," "an," and "the" include plural references unless the context clearly indicates otherwise.

What is claimed is:

1. A system, comprising:
an energy storage device operating according to an operating parameter and comprising a fuel gauge, wherein the fuel gauge is to:
receive a different operating parameter in response to a change in the energy storage device charge state; and
modify a pulse width modulated signal in response to the change in the energy storage device charge state;
a detection component coupled to the fuel gauge and an operating system component, wherein the detection component is to:
detect the modification of the pulse width modulated signal using a filter; and
cause the operating system component to generate an interrupt or alarm to update data representing the energy storage device charge state.

2. The system of claim 1, the operating system component is to display update of the energy storage device charge state in response to generating the interrupt or alarm to update data.

3. The system of claim 1, wherein the fuel gauge is to receive the different operating parameter from an adjustable power source in response to the change in the energy storage device charge state.

4. The system of claim 3, further comprising the adjustable power source adjusting the operating parameter to charge the energy storage device using a taper algorithm during a charging cycle.

5. The system of claim 1, wherein the operating parameter includes at least one of a charge voltage and a charge current.

6. The system of claim 1, wherein the detection component is to detect the modification of the pulse width modulated signal by includes detecting the pulse width modulated signal decreasing.

7. The system of claim 6, wherein the detection component is to cause the operating system to generate the interrupt or alarm in response to the pulse width modulated signal decreasing.

8. The system of claim 1, wherein the filter is a low pass filter.

9. The system of claim 1, the fuel gauge is to write the different operating parameter in registers of the energy storage unit according to a predetermined charge profile based on the state of charge determined.

10. The system of claim 1, wherein the fuel gauge is to update the different operating parameter throughout a charging cycle of the energy storage device.

11. A method comprising:
monitoring, via a fuel gauge operatively integrated with an energy storage device, a state of charge of the energy storage device;
determining, by the fuel gauge, an operating parameter of the energy storage device;
modifying, by the fuel gauge, a pulse width modulated signal to cause an interrupt to an operating system component communicatively coupled to the energy storage device in response to a change in the energy storage device charge state;
receiving, by the fuel gauge from an adjustable power source, a different operating parameter to adjust a charge current to charge the energy storage device in response to the change in the energy storage device charge state; and
indicating, by the fuel gauge, the change in the energy storage device charge state to the operating system component in response to the operating system component detecting the modification of the pulse width modulated signal.

12. The method of claim 11, wherein the method includes controlling the adjustable power source with a request from the fuel gauge for a different operating parameter to adjust a charge current that charges the energy storage device according to a taper algorithm during a charging cycle.

13. The method of claim 11, wherein the method includes receiving the different operating parameter from the adjustable power source includes modifying an output current of the adjustable power source to a different current during a charging of the energy storage device.

14. The method of claim 11, wherein the modifying the pulse width modulated signal comprises toggling the pulse width modulated signal to trigger an event detector of the operating system component.

15. The method of claim 11, wherein the method includes filtering the pulse width modulated signal to detect the frequency.

16. A computing device comprising:
an operating system component to manage hardware and software for the computing device; and
a fuel gauge to:
determine a change in a state of an energy storage device;
request a different operating parameter from an adjustable power source based on the change in the state of the energy storage device determined by the fuel gauge; and transmit a pulse width modulated signal to the operating system component, wherein the signal has a modification based on the change in the state of the energy storage device;

wherein the operating system component is to generate, in response to detection of the modification of the signal, a triggering event to update the state of the energy storage device in accordance with the modification of the signal.

17. The computing device of claim 16, further comprising a detection component coupled to the operating system component, wherein the detection component is to detect a variation in a frequency of the signal using a low pass filter.

18. The computing device of claim 16, wherein the triggering event is an interrupt or alarm that causes a display for the state of the energy storage device to update.

19. The computing device of claim 16, wherein the triggering event comprises an alter flag or an interrupt pulse that varies according to a frequency associated with the modification of the signal.

20. The computing device of claim 16, wherein the state of the energy storage device comprises at least one of:
a charge beginning point;
a charge ending point;
a discharge beginning point;
a discharge ending point; and
a percentage full indicator update.

* * * * *

UNITED STATES PATENT AND TRADEMARK OFFICE
CERTIFICATE OF CORRECTION

PATENT NO. : 10,164,444 B2
APPLICATION NO. : 15/615584
DATED : December 25, 2018
INVENTOR(S) : Thomas P. Sawyers et al.

Page 1 of 1

It is certified that error appears in the above-identified patent and that said Letters Patent is hereby corrected as shown below:

In the Drawings

In sheet 3 of 6, reference numeral 308, Line 2, delete "GUAGE" and insert -- GAUGE --, therefor.

In the Claims

In Column 14, Line 3, in Claim 6, after "by" delete "includes".

Signed and Sealed this
Fifth Day of March, 2019

Andrei Iancu
*Director of the United States Patent and Trademark Office*